United States Patent [19]

Heynen et al.

[11] Patent Number: 4,884,285
[45] Date of Patent: Nov. 28, 1989

[54] (DS) TRANSMITTER

[76] Inventors: Jan Heynen, 2928 Haughton Street, Ottawa, Ontario, Canada, K2B 6Z7; Larry S. Kayser, 36 Glebe Avenue, Ottawa, Ontario, Canada, K1S 2C1; Georges E. Mony, 3576 Marlowe Avenue, Montreal, Quebec, Canada, H5A 3L7

[21] Appl. No.: 14,035

[22] Filed: Feb. 12, 1987

[30] Foreign Application Priority Data

Oct. 22, 1986 [CA] Canada ................................. 521080

[51] Int. Cl.⁴ .............................................. H04B 14/04
[52] U.S. Cl. ........................................... 375/25; 370/77
[58] Field of Search ..................... 375/25, 30; 370/58, 370/77

[56] References Cited

U.S. PATENT DOCUMENTS

| | | |
|---|---|---|
| 3,515,805 | 6/1970 | Fracassi et al. . |
| 3,997,847 | 12/1976 | Tong . |
| 4,010,323 | 3/1977 | Peck . |
| 4,048,440 | 9/1977 | Peck et al. . |
| 4,069,392 | 1/1978 | Goldenberg et al. . |
| 4,085,449 | 4/1978 | Welsh et al. . |
| 4,335,446 | 6/1982 | Gandini et al. . |
| 4,345,325 | 8/1982 | Gandini et al. ..................... 375/25 |
| 4,377,860 | 3/1983 | Godbole ............................ 375/25 |
| 4,425,664 | 1/1984 | Sherman et al. . |
| 4,438,511 | 3/1984 | Baran . |
| 4,439,864 | 3/1984 | Qureshi . |
| 4,455,661 | 6/1984 | Quereshi . |
| 4,457,005 | 6/1984 | Burke et al. . |
| 4,589,106 | 5/1986 | Prather et al. ..................... 370/58 |
| 4,649,533 | 3/1987 | Chorley et al. ..................... 370/58 |

Primary Examiner—Robert L. Griffin
Assistant Examiner—Wellington Chin
Attorney, Agent, or Firm—Hoffman, Wasson, Fallow & Gitler

[57] ABSTRACT

A communication system for connecting a telephone switching office to a data processing center is described. A telephone trunk line from the switching office carries data which is digitally encoded and may be in a compressed format, for example mu-law PCM, and which is derived from remote data terminals. A novel type of modem is connected between the trunk and the data processing center. This is a direct synthesis device which converts the modulated digital data directly to a non-modulated digital format readable by the data processing center and, for digital data originating at the data processing center, produces modulated digital data which is transmitted along the trunk to the switching office. The direct synthesis modem is a single, purely digital device which replaces many separate digital-/analog modems which are required in conventional systems.

18 Claims, 7 Drawing Sheets

INTERRUPT PROCESSING:
PCM:  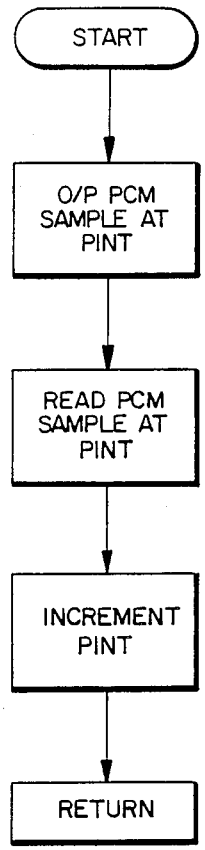
RS 232 I/F  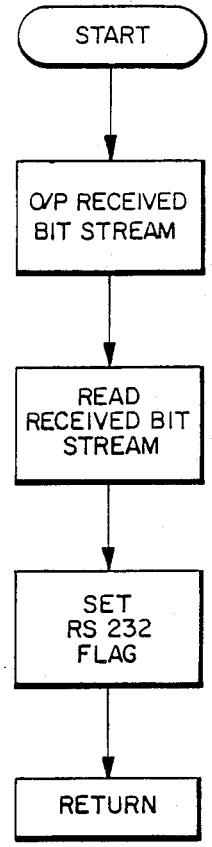
FIG. 7

(DS) TRANSMITTER

BACKGROUND OF THE INVENTION

This invention relates to the communication over a telephone switching network of data between remote data terminals and a centralized data service such as a data processing center, or a data transmission network access point. In the remainder of this description, the term "processing center" will be used, which should be understood as "a transmission terminal point where many modems are typically used presently".

Typically the remote terminals produce serial digital data in a standardized format (e.g. RS232 C) which are converted by modems to analog signals for transmission to the local telephone switching office. In the telephone switching office analog signals from various different remote terminals may be time multiplexed together with telephone voice signals in a pulse code modulation (PCM) format and sent over a trunk to the telephone switching office near the data processing center. Typically the trunk accommodates 24 channels in North America, 30 channels in Europe. On these trunks, the signals are encoded in 8 bit words, via standard codes: mu-law in North America, A-law in Europe. At that remote switching office, the PCM signals are changed back to analog signals for transmission along separate analog loops to respective modems which convert the analog signals back into the initial serial digital data signals which were output from the remote terminals. The data processing center can read the signals in that form. The transmission of data back to the remote terminals is effected in a similar but, of course, reverse manner.

It should be apparent that in the conventional system described above the number of remote terminals which can access the data processing center at any particular time is limited by the number of modems connected between the data processing center and its associated telephone switching office and usually a large "pool" of these modems has to be provided.

It is an object of the present invention to replace this pool of modems with a single apparatus, thereby effecting considerable cost savings.

SUMMARY OF THE INVENTION

According to the invention the single apparatus used may be referred to as a "direct synthesis" modem to denote a digital modem which is capable of synthesizing directly from the PCM samples the digital signals which can be read by the processing center and synthesizing directly from digital signals output from the processing center PCM signals which can be transmitted back along the trunk line.

In summary, according to one aspect the present invention provides a communication system for connecting a telephone switching office to a processing center comprising a telephone trunk capable of carrying in a plurality of channels, PCM signals derived from a plurality of respective remote data terminals and a modem connected between the trunk and the processing center, the modem being arranged to synthesize directly, from the PCM signals, on the trunk, digital data signals readable by the processing center and to synthesize directly from digital data signals output from the processing center PCM signals for transmission on the trunk.

Typically the PCM signals are encoded in North America according to mu-law and in Europe according to A-law. The invention is however, considered also applicable for other types of digitally encoded signals in which the data may or may not be in a compressed format.

Accordingly, a broad aspect of the invention provides a method of transferring data which is in a digitally encoded modulated format and carried on a telephone trunk to a processing center and vice versa comprising directly synthesizing, from the digitally encoded modulated data on the trunk, digital data signals in a non-modulated format readable by the processing center and directly synthesizing, from non-modulated digital data output from the processing center, data which is digitally encoded in a modulated format for transmission on the trunk.

BRIEF DESCRIPTION OF THE DRAWINGS

FIG. 7 is a flow chart illustrating the interrupt processing program.

DESCRIPTION OF THE PREFERRED EMBODIMENT

Figure 1:
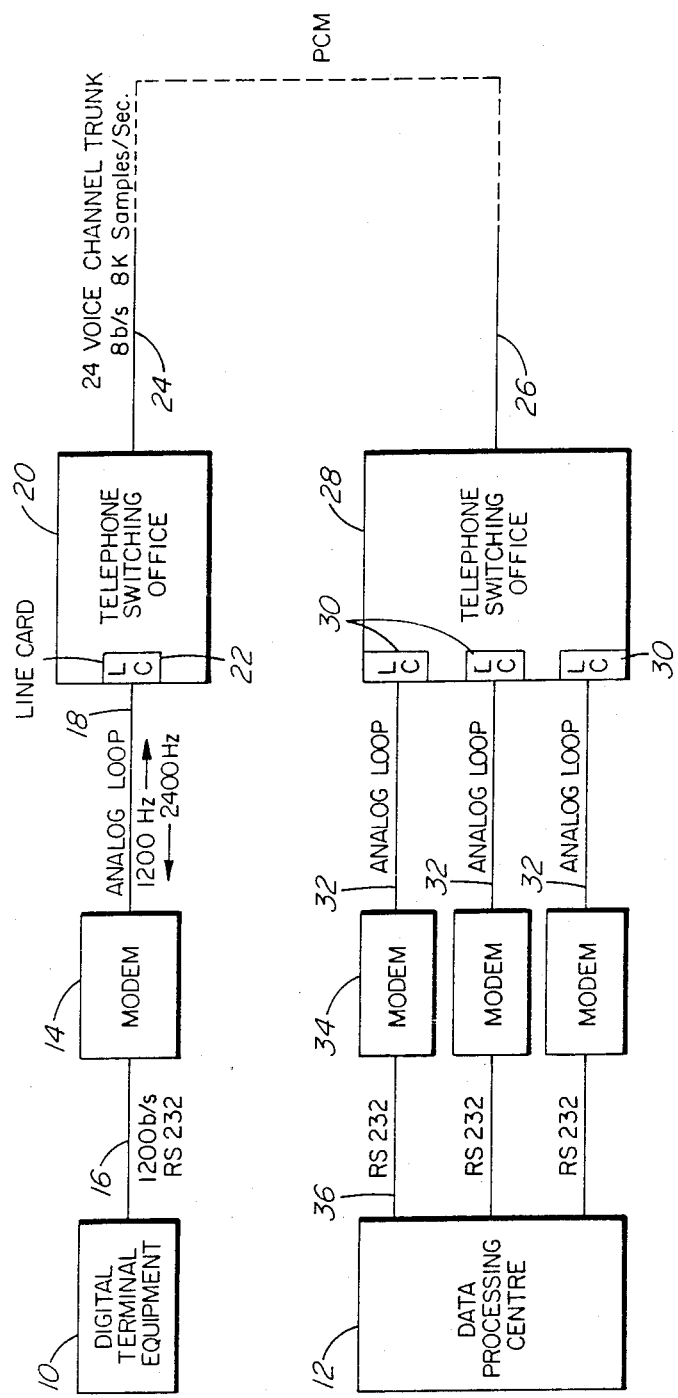
FIG. 1 is a block diagram of a conventional telecommunication system for connecting remote terminals through a telephone switching network to access a centralized service (for example a data processing center) using a large number of analog modems.

Referring firstly to FIG. 1, reference numeral 10 represents a digital terminal equipment (D.T.E.), a home computer for example, with which a user wishes to access a centralized service such as a data processing center 12.

A modem 14 connects terminal 10 to a telephone line. More specifically, the output from terminal 10 is a digital signal (for example 1200 b/s) on an RS232 line 16 and this digital signal is processed by the modem and then converted in the modem to a signal on an analog carrier (for example 1200 or 2400 Hz) which is transmitted on analog loop (normal telephone line) 18. Loop 18 is connected to the nearest telephone switching office 20 through a line card (L.C.) 22 which is located in the switching office 20. The line card 22 includes a codec, not specifically shown, which converts the signal from modem 14 into a form (typically a 64 Kb/sec PCM mu-law or A-law companded format) suitable for transmission in time multiplexed form with signals which may be input at other line cards (not shown) in switching office 20. The multiplexed signals are then output from switching office 20 on a trunk 24, carrying multiple voice channels. Typically in North America the trunk carries 24, in Europe 30 voice or modem data channels.

There may be several trunks and switching offices in the network but ultimately a trunk 26 connects to a telephone switching office 28 which is local to the data processing center 12. Switching office 28 has a plurality (three are shown) of line cards 30 which include codecs for converting the multiplexed PCM signals on trunk 26 back into individual analog signals for separate transmission along analog loops 32. Each loop 32 connects to a respective modem 34 which converts the analog signal on loop 32 to a digital data signal which is fed along a respective RS232 line 36 to data processing center 12. Modems 34 may be identical to modem 14.

In this way communication between the DTE 10 and the data processing center is established. Of course, information from data processing center 12 is sent back to DTE 10 in the reverse manner to that indicated above for sending signals from DTE 10 to data processing center 12. It can be seen that for every DTE that is connected to the system there has to be a respective modem 34 to ensure simultaneous access of the data processing center by a plurality of users.

Figure 2:
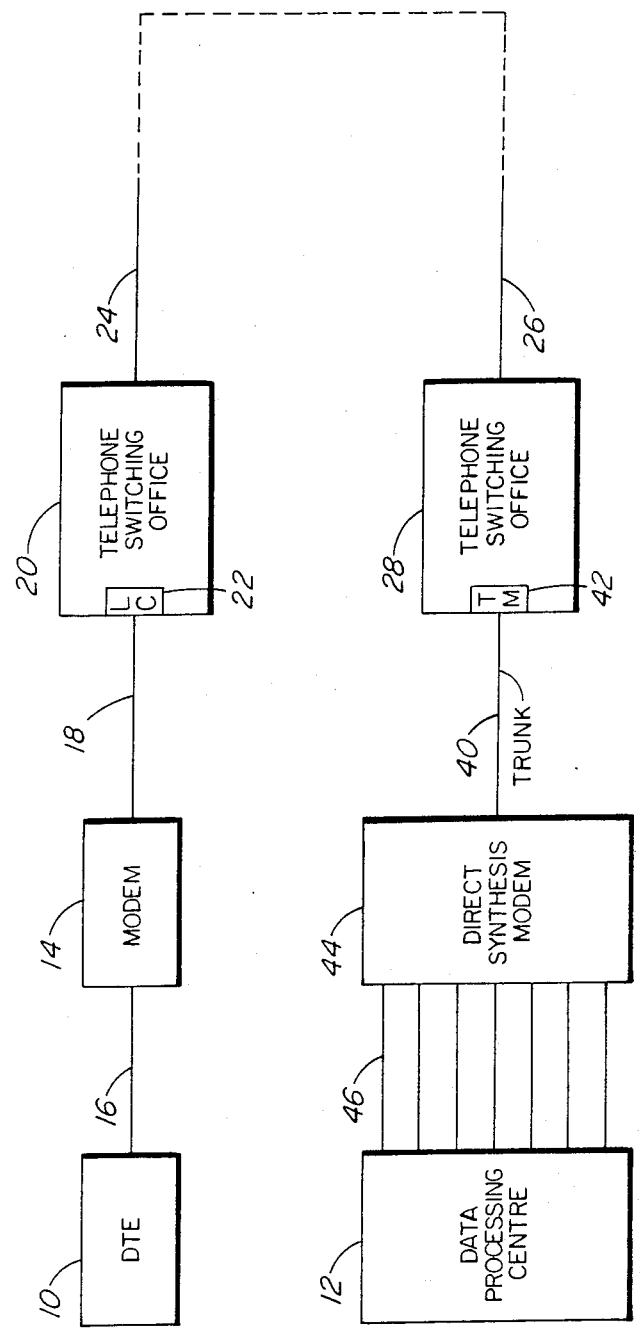
FIG. 2 is a block diagram of a telecommunication system for carrying out the same broad function as the conventional system of FIG. 1 but which is constructed in accordance with the present invention.

Referring now to FIG. 2 which is a block diagram of the inventive system, the various components and interconnections between DTE 10 and telephone switching office 28 are identical to the prior art system of FIG. 1 and bear identical reference numerals. However, the analog loops 32 of the prior system are replaced with a single trunk 40 which is identical to trunk 24 or 26. Although switching office 28 will include line cards for other purposes, these are not used as are line cards 30 in the prior system. Instead, a trunk module (T.M.) 42, which is also a standard component of switching offices for terminating TDM (Time Division Multiplex) trunks, is used and it is from this trunk module that trunk 40 extends.

TDM trunk 40 is connected at its other end to a single direct synthesis (D.S.) modem 44 which replaces the plurality of modems 34, up to the maximum number of channels in the trunk. D.S. modem 44 directly converts the P.C.M. signals to straight digital data signals which are carried on respective RS232 lines 46 to the data processing center 12. Of course, for the reverse direction, D.S. modem 44 converts the digital input from data processing center 12 to P.C.M. signals which are sent along trunk 40.

Although FIG. 2 shows the use of a plurality of separate RS232 lines 46, these could be replaced by direct bus access from modem 44 to center 12 and this would involve 24 channels time shared on a single cable.

Figure 3:
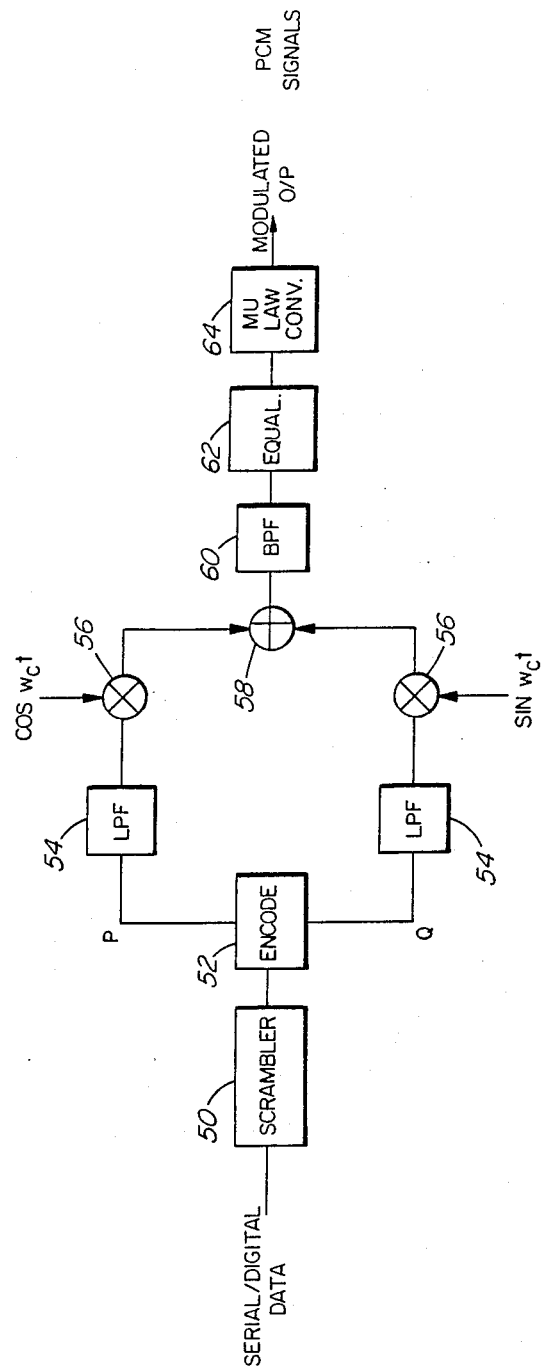
FIG. 3 is a block diagram illustrating the functional blocks of the transmitter portion of a novel modem forming part of the system of FIG. 2.
Figure 4:
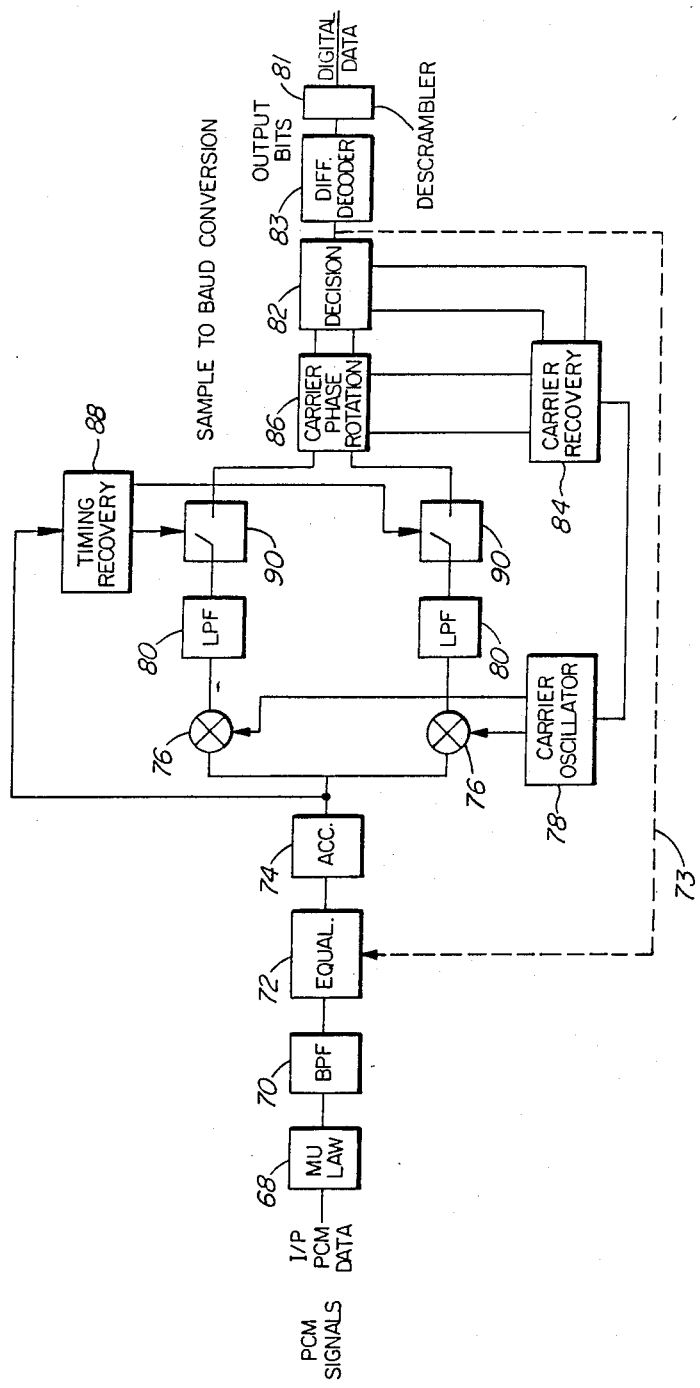
FIG. 4 is a block diagram illustrating the functional blocks of the receiver portion of the novel modem.

Direct synthesis modem 44 is a novel device which was designed by the inventors for implementing the novel system of FIG. 2. In one embodiment the modem was based on a general purpose digital signal processing chip, specifically a TMS 32010 microprocessor available from Texas Instruments although any equivalent DSP device could be used, and included firmware in the form of a Read Only Memory (ROM) or Random Access Memory (RAM) carrying a program designed by the inventors to achieve the direct synthesis of the serial digital data signals to P.C.M. multiplexed signals and vice versa. The conversion of digital data to P.C.M. constitutes the transmit mode and the conversion of P.C.M. to digital data constitutes the receive mode of D.S. modem 44. FIGS. 3 and 4 illustrate the functional blocks which have to be achieved in each of these two modes.

In the following discussion of the transmit and receive functions a bit rate of 1200 b/sec is assumed but it should be appreciated that other bit rates, both higher and lower, may be used. However, with higher bit rates more advanced filtering and equalization is required.

With reference to FIG. 3, the input 1200 b/sec signal from an RS232 line 46 is fed firstly to a scrambler 50 which scrambles the data sequence thereby ensuring sufficient clocking content. The scrambling algorithm is defined by the choice of the modem 14 that is used on the data connection.

After the scrambler the input bit stream is multi-level coded in an encoder or look-up table 52 to produce the signals P and Q, the duration of which determines the line modulation or baud rate. In the present example with an input rate of 1200 bit/sec, P and Q are ± K depending on the phase angle desired. P and Q in this case determine the amplitude of a sine and cosine carrier signal. To relax the constraint of knowing the exact phase of the carrier at the receiver, the bits are encoded differentially. That is, each group of 2 consecutive bits (dibits) is encoded as a phase change relative to the phase of the preceding signal element. In so doing, although the absolute phase of the recovered signal may be incorrect, the phase difference is preserved. For the 212A, modem, operating at 1200 b/s for example, the differential encoding is shown in table 1.

TABLE 1

| Differential encoding table example | |
|---|---|
| Dibit values (1200 bps) | Phase change |
| 0 0 | +90° |
| 0 1 | 0° |
| 1 1 | +270° |
| 1 0 | +180° |

Signals P and Q pass through respective low pass filters 54 to quadrature modulators 56 fed respectively by carriers sin $w_c t$ and cos $w_c t$.

The outputs of modulators 56 are combined in an adder 58 and then passed through a bandpass filter 60 to an equalizer 62. The lowpass filters 54 are required to suppress the high frequency components of the modulating square wave which when modulated would produce aliasing in the pass band of the transmitted signal. The filters may be designed to provide sufficient attenuation of aliasing within the pass band whilst any frequency components outside may be removed with the bandpass filter 60.

The overall spectral shaping (including both receiver and transmitter filters) is specified as being equal to a modified raised cosine characteristic which has odd symmetry about half the transmission rate frequency. The overall spectral response of the lowpass and bandpass filters (either transmitter or receiver) is equal to the square root of the raised cosine. The shape of the latter and hence the bandwidth of the signal, is adjusted with a roll off factor. The CCITT V22 recommendation specifies a 75 % rolloff to give a modulated signal bandwidth of 1050 Hz at 600 baud.

Equalization is included to compensate for the nonlinear delay characteristics of the channel. The delay characteristic is often arranged to be a compromise for the average characteristics one might obtain. The bandwidth of the signal on the channel depends on the baud rate: hence different multi-level signals with different information rates (1200:2400 ... 4800 bps) can have the same bandwidth through the use of more complex coding schemes However, as the information rate increases, the sensitivity to frequency and phase shifts in the channel increases, thus requiring better equalization. In the present V22bis implementation, (for 1200 and 2400 b/s operation), self-adapting equalization is used at the receiver, while fixed compromise equalization is applied at the transmitter.

The output stage of the transmitter, in North American applications, is a mu-law converter or compressor 64 where operations that have been done in the modem to an accuracy of 13 bits are converted to 8-bit PCM.

With reference to FIG. 4, the input PCM data at 8 KHz on trunk 40 is fed to a mu-law to linear converter or expander 68 which provides 13-bit digital samples which are fed through a bandpass filter 70, to an equalizer 72. As explained above in relation to the transmit function, the equalizer 72 compensates for the channel's delay distortion An adaptive equalizer is used whose parameters are adjusted, depending on measured signal characteristics (see dotted line 73 in FIG. 4).

The next block is an Automatic Gain Control 74 which is required to correct for amplitude fluctuations which might cause erroneous detection as well as correcting for the wide range of path-dependent signal levels. With the 4-phase 212A modem amplitude fluctuations are usually not too serious since all information is contained in the phase shift. With higher bit rates (such as V22bis) information is coded in terms of both amplitude and phase rendering AGC all the more necessary.

Demodulation using demodulators 76 is done coherently. Digital representations of sine and cosine carriers from a digitally simulated oscillator 78 are multiplied with the input signal (with the same phase) to produce the modulating components P and Q as well as a superimposed AC component at twice the carrier frequency. The latter is removed with integration by lowpass filters 80.

A decision circuit 82 determines the absolute amplitude of the modulating signal. A differential decoder 83 generates the binary output. This binary output is applied to a descrambler 81 which recreates the original data stream using an algorithm similar to that used in the scrambler.

Since the data are encoded differentially, the signal value determined for the current baud is compared with that for the preceding baud to ascertain the phase difference. The latter is then decoded to give the appropriate number of data bits. Being differentially encoded, the phase of the demodulating carriers may be different from the modulating carriers by a multiple of 90° and still demodulate correctly. This relaxes the constraint of having exactly the same phase provided the phase difference is a multiple of 90°.

Timing and carrier recovery to synchronize with the transmitting modem are necessary. These functions are required in conventional analog/digital modems and will not, therefore, be described in detail. The carrier recovery function is exemplified by a carrier recovery block 84 which is driven by a signal from the decision circuit 82 which is proportional to the demodulation carrier phase error. A first feedback loop from carrier recovery block 84 controls carrier oscillator 78 and a second feedback loop causes rotation of data in a phase rotation block 86 thus suppressing data clock phase jitter. Timing recovery blocks 88 together with sample blocks 90 are used to sample the signals out of the LPF's 80 at the baud rate with the proper timing.

Figure 5:
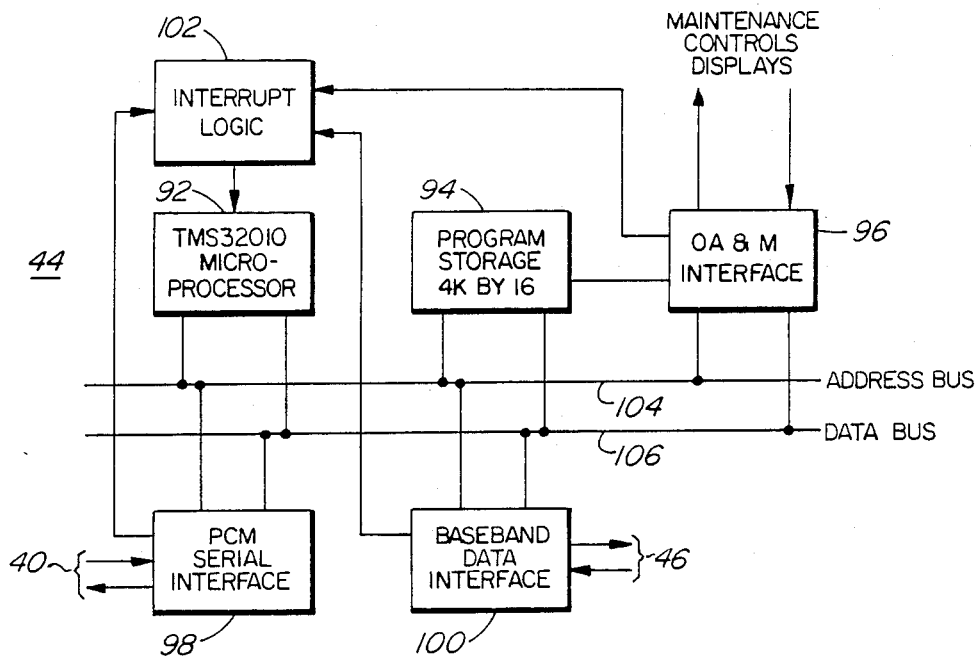
FIG. 5 is a block diagram of essential elements of a particular embodiment of direct synthesis modem.

With reference now to FIG. 5, this shows typical hardware components of a direct synthesis modem 44. The heart of the modem is a special purpose microprocessor 92 (DSP) such as the TMS 32010 or equivalent. The program for carrying out the functions specified in FIGS. 3 and 4 may be stored in a ROM. However, in the embodiment shown, a RAM 94 is used. This permits the flexibility of making changes in the program, for instance when a new type of modem becomes available in the market place. Such reprogramming can be effected by an external system via an Operation, Administration and Maintenance (OA&M) interface 96 which is directly connected to RAM 94.

The OA&M interface 96 also connects to other external systems (not shown) which are used in the maintenance and testing of D.S. functions which may include the collection of transmission quality data, traffic statistics and the initiation of remote test procedures for transmission lines and terminals.

Trunk 40 interfaces with modem 44 via a PCM serial interface 98 and RS 232 lines 46 are interfaced with modem 44 via a baseband data interface 100 which may consist of parallel ports or serial ports depending upon whether parallel lines 46 or time sharing cables are used for connection to data processing center 12.

The remaining block of FIG. 5 is an interrupt logic block 102 which is directly connected to the processor 92, OA&M interface 96 and also to data interfaces 98 and 100. The interrupt logic 102 serves to interrupt the main program operating microprocessor 92 to permit the data in interfaces 98 and 100 to be serviced and also, as desired, to permit OA&M functions to be carried out via OA&M interface 96.

Address bus 104 is connected to address ports of the processor 92, the RAM 94 and the interfaces 96, 98 and 100. Data bus 106 is connected to data ports of these same components.

In order to synchronize the serial digital data on RS 232 lines 46 to the internal rate of the modem whether it is in the transmit or receive mode a USART (universal synchronous asynchronous receiver/transmitter) function is typically required in the D.S. equipment. This USART function may be implemented either in hardware form, in which case it would be represented as part of baseband data interface 100, or in software form in which case it would be represented as a functional block located immediately before scrambler 50 in FIG. 3 and a functional block located immediately after the descrambler 81 in FIG. 4.

Figure 6:
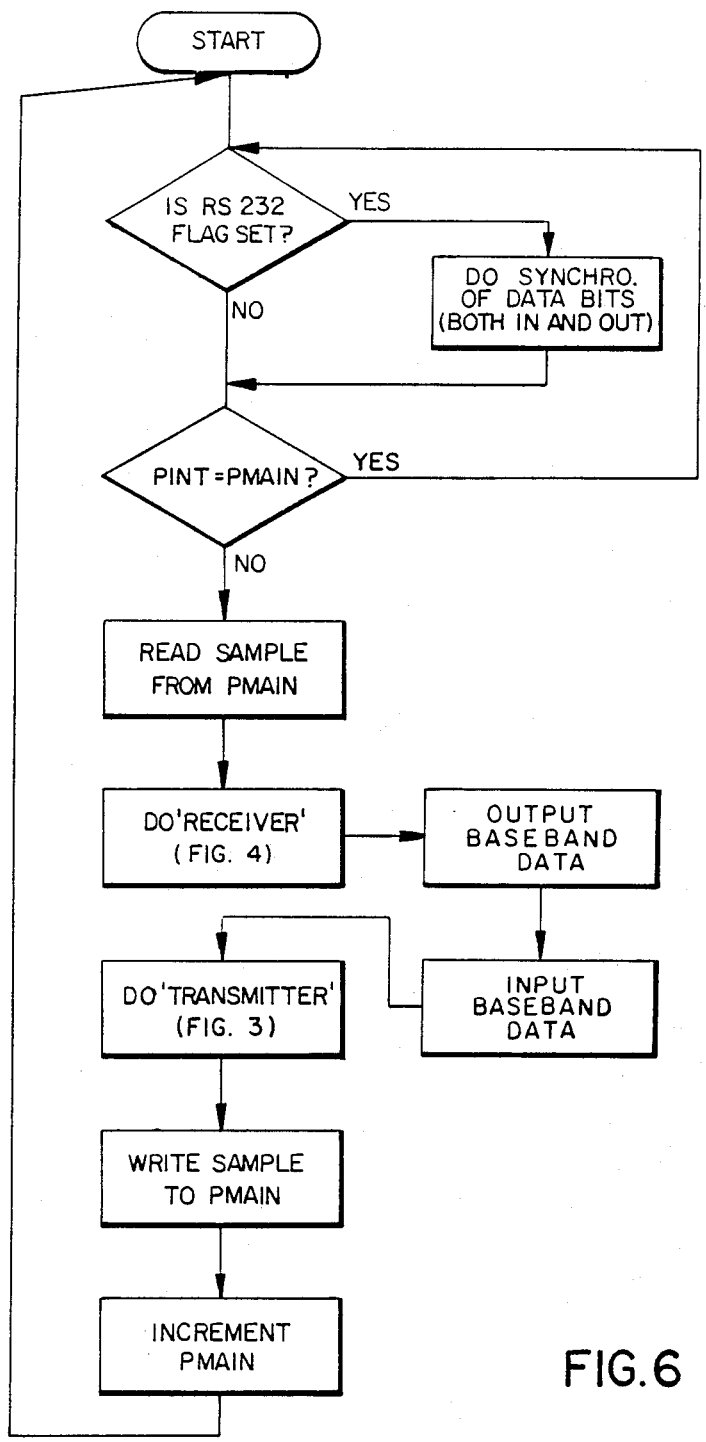
FIG. 6 is a flow chart illustrating the modem processing program.

Referring to FIGS. 6 and 7, the "modem" function operates as a loop that can be interrupted at any time by either a PCM Interrupt (when a new sample has been received) or when data bits need to be exchanged between the DSP and the RS-232 transceiver buffers. The PCM data is fed through a "circular" buffer to absorb differences in modem processing time. Data is read and written by the PCM Interrupt routine at queue location "PINT" and is read and written by the modem program at location "PMAIN".

FIG. 6 is a flow chart illustrating the processing of the direct synthesis modem. With reference to FIG. 6, RS232 flag decision determines if EIA processing is required.

if yes: The synchro algorithm is processed to account for slight discrepancy between timing characteristics of the 8 Khz PCM data and the 1200 baud modem. A decision process adds or deletes stop bits (or ½ a stop bit) to the incoming/outgoing EIA streams to ensure that buffers do not overflow or underflow.

check if PINT and PMAIN are pointing to the same circular buffer location indicating all data has been processed.

if not: process a PCM sample from the buffer at location PMAIN, the next unprocessed sample.

the sample is processed according to the techniques depicted in FIG. 4.

the result is placed in a holding register for the outbound "synchro" process to work on.

a byte from the incoming "synchro" process is then read.

this is processed by the transmitter algorithm depicted in FIG. 3.

the result is placed in the circular buffer at the same PMAIN location used above.

PMAIN pointer is then incremented to complete the processing loop. With reference now to FIG. 7 which illustrates the interrupt processing, the following steps are carried out.

PCM

Output the sample in the circular buffer pointed to by pointer PINT.

Take the new incoming PCM data sample and store it at the same PINT location.

Increment PINT to the next location.

At start up, the output is meaningless until the pointers have passed once through the buffer.

RS232

Output processed data to the RS232 output channel.

Accept a new data byte from the receive channel.

Set the RS232 Flag to inform the main program that new data has been received for processing (The EIA process will run only 3 times for every 40 through the PCM Process [600/8000]).

Incidentally, the circular buffer is used to account for variations in the software processing time. These variations are caused by periodic differences in the length of the processing loop. The PCM interrupts occur 8000 timers per second while the USART port causes an interrupt 600 times a second (once for every 2 bits at 1200 baud). Two pointers wrap around in a fixed address space. PINT typically moves ahead of PMAIN with the size of the buffer selected to account for the worst case increase in processing time if both interrupts occur at the same time.

The benefits of the direct synthesis technique of the present invention over the conventional technique illustrated in FIG. 1 can be summarized as follows:

(1) Since the modulation/demodulation function is carried out using digital signal processing techniques, any one of a large number of different modulation schemes can be accommodated in one piece of equipment by simply changing the content of its program memory. Performing this switching of modem types from a remote test center leads to operational savings and convenience.

(2) A second benefit is the exact repeatability of the processing due to its digital (numerical) nature, simplifying diagnostics, testing and maintenance. Thus a predetermined input sequence of numbers produces an exact output sequence, allowing ready verification of correct functioning of the firmware "modem".

(3) The digital implementation of the modem contains a number of critical system parameters that can be used to extract information on the quality of transmission. Typical of such parameters would be the loss on the line, the amplitude and phase (envelope) distortion and potentially an estimated (expected) error rate. By connecting the DS modem to a remote test center, the facility could thus be remotely monitored, affording savings in operating costs.

(4) The output format of the Direct Synthesis modem is readily adapted to any number of different data transmission or processing equipment formats and protocols, thus allowing simplified and cheaper interfaces. (Examples are time multiplexed bus interfaces, IBM channel interfaces, packet network equipment interfaces, digital trunk equipment interfaces).

What we claim as our invention is:

1. A method of transferring data from a telephone switching office to a remote processing center at a customer's premises via a telephone trunk, the data being multiplexed in a digitally encoded modulated format and carried on the telephone trunk to the processing center and vice versa comprising directly synthesizing at the customer's premises, from the digitally encoded modulated data multiplexed on the trunk, a plurality of digital data signals in a non-modulated format readable by the processing center and directly synthesizing at the customer's premises, a plurality of non-modulated digital data signals output from the processing center, data which is multiplexed in a digitally encoded modulated format for transmission on the trunk.

2. A method according to claim 1 in which the modulated data on the trunk is in the form of PCM signals.

3. A method according to claim 1 in which the modulated data in the trunk is in the form of mu-law PCM signals.

4. A method according to claim 1 in which the modulated data on the trunk is in the form of A-law PCM signals.

5. A communication system for connecting a telephone switching office to a remote processing center at a customer's premises comprising a telephone trunk capable of carrying data which is multiplexed in a digitally encoded modulated format and which is derived from a plurality of remote data terminals and a modem located at the customer's premises and arranged to synthesize directly from the digitally encoded modulated data multiplexed on the trunk, a plurality of digital data signals in a non-modulated format readable by the processing center and to synthesize directly, from a plurality of non-modulated digital signals output from the processing center, data which is multiplexed in a digitally encoded modulated format for transmission on the trunk.

6. A communication system for connecting a telephone switching office to a remote processing center at a customer's premises comprising a telephone trunk capable of carrying in a plurality of channels, multiplexed PCM signals derived from a plurality of respective remote data terminals and a modem located at the customer's premises and connected between the trunk and the processing center, the modem being arranged to synthesize directly, from the multiplexed PCM signals on the trunk, a plurality of non-modulated digital data signals readable by the processing center and to synthesize directly, from a plurality of non-modulated digital data signals output from the processing center, multiplexed PCM signals for transmission on the trunk.

7. A communication system for connecting a telephone office to a remote processing center at a customer's premises comprising a telephone trunk capable of carrying in a plurality of channels, multiplexed mu-law PCM signals derived from a plurality of respective remote data terminals and a model located at the customer's premises and connected between the trunk and the processing center, the modem being arranged to synthesize directly, from the multiplexed mu-law PCM signals on the trunk, a plurality of non-modulated digital data signals readable by the processing center and to synthesize directly, from a plurality of non-modulated digital data signals output from the processing center, multiplexed mu-law PCM signals for transmission on the trunk.

8. A communication system for connecting a telephone switching office to a remote processing center at a customer's premises comprising a telephone trunk capable of carrying a plurality of channels, multiplexed A-law PCM signals derived from a plurality of respective remote data terminals and a modem located at the customer's premises and connected between the trunk and the processing center, the modem being arranged to synthesize directly, from the multiplexed A-law PCM signals on the trunk, a plurality of non-modulated digital data signals readable by the processing center and to synthesize directly, from a plurality of non-modulated digital data signals output from the processing center, multiplexed A-law PCM signals for transmission on the trunk.

9. A method of transferring data from a plurality of digital terminal equipment at respective customer's premises to a remote processing center at another customer's premises comprising converting at the respective customer's premises a plurality of digital signals respectively output from the digital terminal equipments to corresponding analog signals in respective analog modems, converting at a first telephone switching office the analog signals to multiplexed digitally encoded modulated signals, passing the multiplexed digitally encoded modulated signals along a trunk to a second telephone switching office, passing the multiplexed digitally encoded modulated signals from the second telephone switching office along another trunk to the other customer's premises, and directly synthesizing at the other customer's premises, from the multiplexed digitally encoded modulated signals, a plurality of non-modulated digital signals readable by the processing center.

10. A method of transferring data from a processing center at a customer's premises to a plurality of digital terminal equipments located at respective other customer's premises and connected to respective analog modems also at the other customer's premises comprising directly synthesizing at the customer's premises, from a plurality of digital signals output from the processing center, multiplexed digitally enclosed modulated signals, passing the multiplexed digitally encoded modulated signals along a trunk to a first telephone switching office, passing the multiplexed digitally encoded modulated signals along another trunk from the first switching office to a second switching office, converting at the second switching office the multiplexed digitally encoded modulated signals to analog signals, and converting at the other customer's premises the analog signals by means of the analog modems to a plurality of non-modulated digital signals readable by the digital terminal equipments.

11. A method of transferring data in both directions between digital terminal equipments and a processing center comprising carrying out the steps of claim 9 or claim 10.

12. A method of transferring data in both directions between digital terminal equipments and a processing center, comprising carrying out the steps of claim 9 or 10 and wherein the digitally encoded modulated signals are PCM signals.

13. A method of transferring data in both directions between digital terminal equipments and a processing center, comprising carrying out the steps of claims 9 or 10 and wherein the digitally encoded modulated signals are mu-law PCM signals.

14. A method of transferring data in both directions between digital terminal equipments and a processing center, comprising carrying out the steps of claims 9 or 10 and wherein the digitally encoded modulated signals are A-law PCM signals.

15. A communication system for connecting a plurality of digital terminal equipments at respective customer's premises to a processing center at another customer's premises comprising a plurality of analog modems located at the respective customer's premises and connected respectively between the digital terminal equipments and a first telephone switching office, means at the first telephone switching office for converting analog signals from the analog modems to multiplexed digitally encoded modulated signals and vice versa, first transmission means for carrying multiplexed digitally encoded modulated signals between the first telephone switching office and a second telephone switching office, second transmission means for carrying multiplexed digitally encoded modulated signals in both directions between the second telephone switching office and a direct synthesis modem located at the other customer's premises and which is connected in turn to the processing center, the direct synthesis modem being arranged to synthesize directly, from the multiplexed digitally encoded modulated signals on the second transmission means, a plurality of non-modulated digital signals readably by the processing center and to synthesize directly, from a plurality of non-modulated digital signals output from the processing center, multiplexed digitally encoded modulated signals for transmission on the second transmission means and subsequently the first transmission means.

16. A communication system according to claim 15 wherein the digitally encoded modulated signals are PCM signals.

17. A communication system according to claim 15 wherein the digitally encoded modulated signals are mu-law PCM signals.

18. A communication system according to claim 15 wherein the digitally encoded modulated signals are A-law PCM signals.

* * * * *

UNITED STATES PATENT AND TRADEMARK OFFICE
CERTIFICATE OF CORRECTION

PATENT NO. : 4,884,285
DATED : November 28, 1989
INVENTOR(S) : Jan Heynen et al

It is certified that error appears in the above-identified patent and that said Letters Patent is hereby corrected as shown below:

On the title page Insert

--(73) Assignee: Northern Telecom Limited
Montreal, Quebec, Canada--.

Signed and Sealed this

Twenty-fourth Day of April, 1990

Attest:

HARRY F. MANBECK, JR.

*Attesting Officer*   *Commissioner of Patents and Trademarks*